United States Patent [19]

Yoshida

[11] Patent Number: 5,668,642
[45] Date of Patent: Sep. 16, 1997

[54] IMAGE DATA COMMUNICATION APPARATUS CAPABLE OF RECEIVING IMAGE DATA DURING POWER FAILURE

[75] Inventor: Takehiro Yoshida, Tokyo, Japan

[73] Assignee: Canon Kabushiki Kaisha, Tokyo, Japan

[21] Appl. No.: 630,272

[22] Filed: Apr. 10, 1996

Related U.S. Application Data

[63] Continuation of Ser. No. 230,518, Apr. 20, 1994, abandoned.

[30] Foreign Application Priority Data

Apr. 22, 1993 [JP] Japan .................................. 5-095986

[51] Int. Cl.$^6$ ........................................... H04N 1/00
[52] U.S. Cl. .................... 358/437; 358/400; 358/404; 358/442
[58] Field of Search .................... 358/400, 406, 358/442, 444, 468, 404, 437, 441; 379/60, 100; 455/383, 343; 348/730; 395/113, 114, 115; H04N 1/00

[56] References Cited

U.S. PATENT DOCUMENTS

| | | | |
|---|---|---|---|
| 5,103,318 | 4/1992 | Takaoka | 358/444 |
| 5,182,655 | 1/1993 | Motoyanagi | 358/400 |
| 5,194,968 | 3/1993 | Nakajima et al. | 358/400 |
| 5,289,524 | 2/1994 | Takano et al. | 455/38.3 |
| 5,475,500 | 12/1995 | Takeda | 358/468 |
| 5,490,287 | 2/1996 | Itoh et al. | 352/442 |

*Primary Examiner*—Kim Vu
*Attorney, Agent, or Firm*—Fitzpatrick, Cella, Harper & Scinto

[57] ABSTRACT

A facsimile apparatus has a communication unit, a memory for storing image data, and a back-up power supply for supplying power to the memory at power stoppage. The apparatus includes a detector for detecting power stoppage, and a control circuit for causing the communication unit to perform reception when the power stoppage is detected by the detector, and for causing the memory to store image data received by the communication unit, wherein the back-up power supply supplies power to the communication unit.

53 Claims, 6 Drawing Sheets

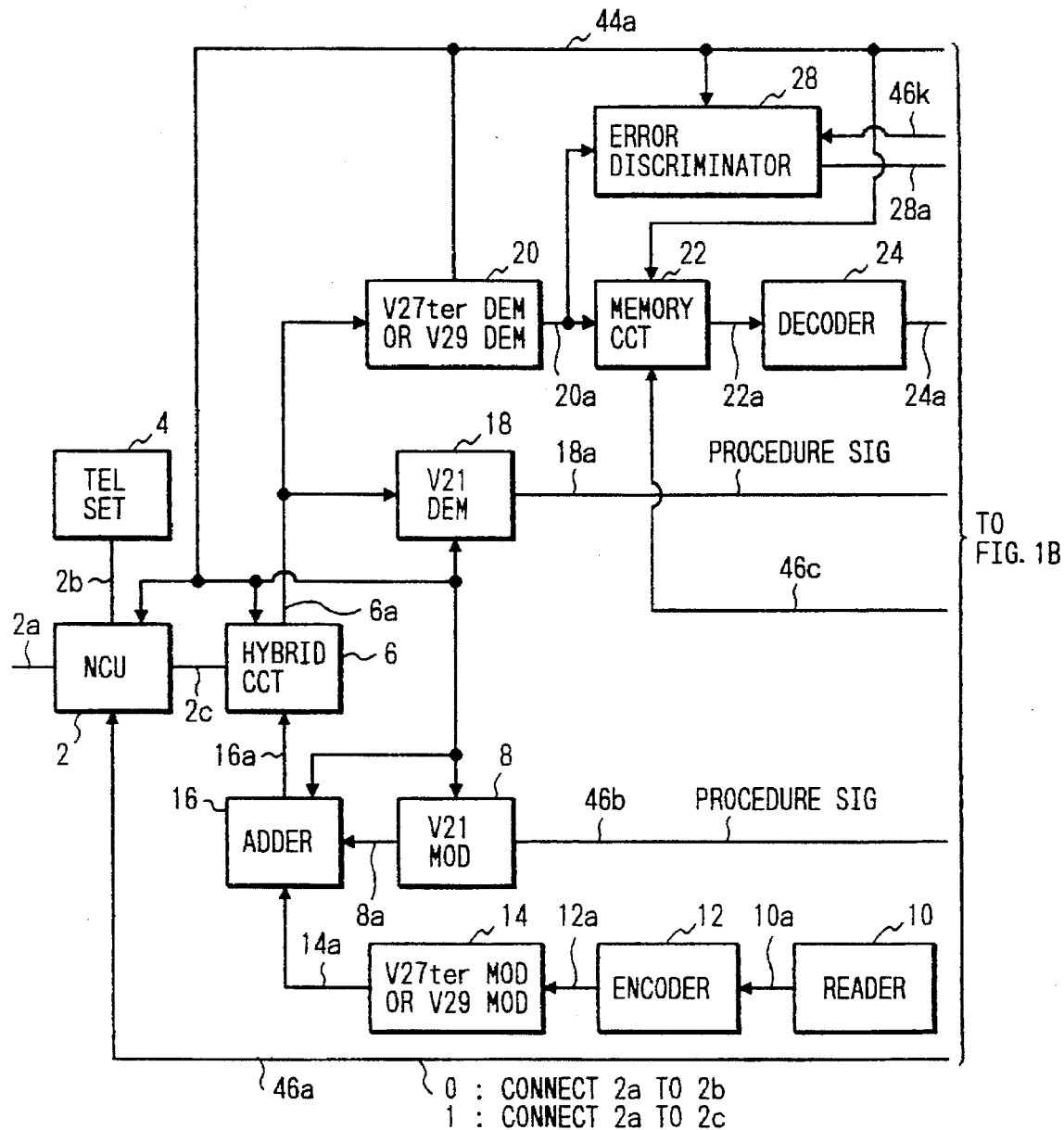

IMAGE DATA COMMUNICATION APPARATUS CAPABLE OF RECEIVING IMAGE DATA DURING POWER FAILURE

This application is a continuation of Application No. 08/230,518, filed Apr. 20, 1994, now abandoned.

BACKGROUND OF THE INVENTION

1. Field of the Invention

The present invention relates to a facsimile apparatus and, more particularly, to an operation to be performed at power stoppage.

2. Related Background Art

There are two types of conventional facsimile apparatuses. In one type, when power stoppage occurs, information which has been received by a memory is kept stored by a back-up function. In the other type, the information is deleted at power stoppage. If, however, the receive mode is selected at power stoppage, all reception must be performed manually, causing a telephone set to ring.

For this reason, when power stoppage occurs, communication cannot be performed even though speech communication is allowed. This may lead to the loss of a big business chance.

SUMMARY OF THE INVENTION

It is an object of the present invention to improve a facsimile apparatus.

It is another object of the present invention to improve a facsimile apparatus having a memory for storing received image data.

It is still another object of the present invention to provide a facsimile apparatus which can memory-receive data at power stoppage.

DETAILED DESCRIPTION OF THE PREFERRED EMBODIMENTS (First Embodiment)

An embodiment of the present invention will be described in detail below with reference to the accompanying drawings.

Figure 1B:
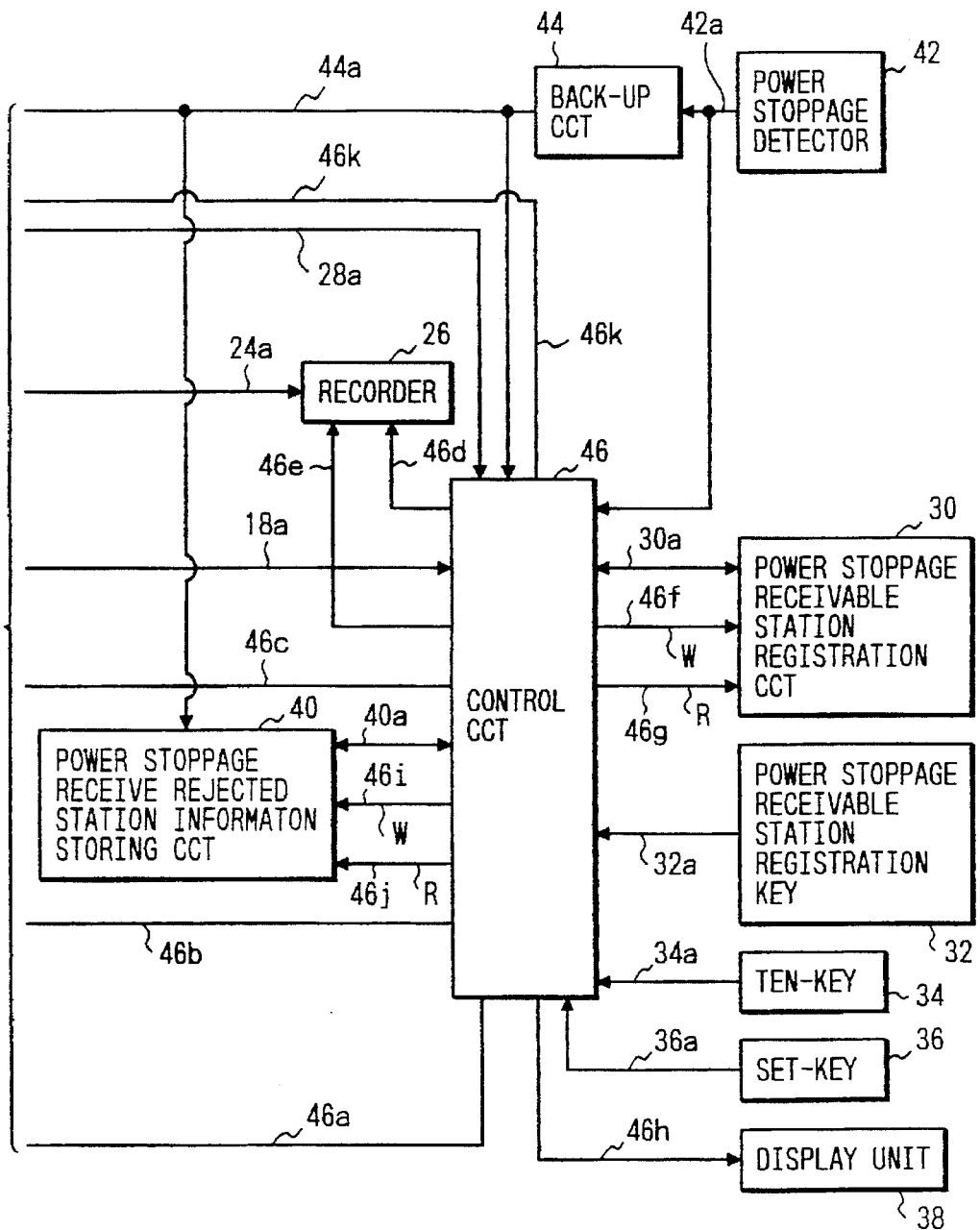
FIG. 1 is comprised of FIGS. 1A and 1B showing block diagrams of a facsimile apparatus according to an embodiment of the present invention.

FIGS. 1A and 1B are block diagrams showing a facsimile apparatus according to an embodiment of the present invention.

Referring to FIGS. 1A and 1B, an NCU (Network Control Unit) 2 connects a telephone network to terminals connected to the lines of the NCU 2 to use the telephone network for data communication and the like. That is, the NCU 2 performs connection control with respect to a telephone switched network, switches to a data communication path, and holds a loop. A signal line 2a is a telephone line. The NCU 2 receives a signal on a signal line 46a, and connects the telephone line to the telephone set side, i.e., connects the signal line 2a to a signal line 2b, when the signal level is "0". When the signal level is "1", the NCU 2 connects the telephone line to the facsimile apparatus side i.e., connects the signal line 2a to a signal line 2c. In a normal state, the telephone line is connected to the telephone set side.

The apparatus includes a telephone set 4.

A hybrid circuit 6 serves to separate signals into signals for the transmission system and signals for the reception system. More specifically, a transmission signal on a signal line 16a is sent to the telephone line via the signal line 2c and the NCU 2. A signal sent from a distant station is output to a signal line 6a via the NCU 2 and the signal line 2c.

A modulator 8 performs modulation on the basis of the known CCITT recommendation v21. The modulator 8 receives a procedure signal on a signal line 46b, modulates it, and outputs the modulated data to a signal line 8a.

A reader 10 sequentially reads a one-line image signal from a transmission original in the main scanning direction, and forms a signal string constituted by binary values representing "white" and "black". The reader 10 is constituted by an image pickup device, e.g., a CCD (charge-coupled device), and an optical system. The signal string as binary values representing "white" and "black" is output to a signal line 10a.

An encoder 12 receives read data output to the signal line 10a, and outputs coded (MH (modified Huffman) coding or MR (modified Read) coding) data to a signal line 12a.

A modulator 14 performs modulation on the basis of the known CCITT recommendation v27ter (differential phase modulation) or CCITT recommendation v29 (quadrature modulation). The modulator 14 receives the signal on the signal line 12a, modulates it, and outputs the modulated data to a signal line 14a.

An adder 16 receives the signals on the signal lines 8a and 14a, and outputs the sum to the signal line 16a.

A demodulator 18 performs demodulation on the basis of the known CCITT recommendation v21. The demodulator 18 receives the signal on the signal line 6a, demodulates it on the basis of the CCITT recommendation v21, and outputs the demodulated data to a signal line 18a.

A demodulator 20 performs demodulation on the basis of the known CCITT recommendation v27ter (differential phase modulation) or CCITT recommendation v29 (quadrature modulation). The demodulator 20 receives the signal on the signal line 6a, demodulates it, and outputs the demodulated data to a signal line 20a.

A memory circuit 22 stores the demodulated data output to the signal line 20a in accordance with control through a signal line 46c. In addition, the memory circuit 22 outputs the data stored therein to a signal line 22a in accordance with control through the signal line 46c.

A decoder 24 receives the signal output to the signal line 22a, and outputs the decoded signal (MH (modified Huffman) decoding or MR (modified Read) decoding) to a signal line 24a.

A recorder 26 performs no recording operation when a signal "0" is output to a signal line 46d. When a signal "1" is output to the signal line 46d, the recorder 26 receives the data output to the signal line 24a. When a signal "2" is output to the signal line 46d, the recorder 26 receives data output to a signal line 46e. Upon reception of the data, the recorder 26 sequentially records the data in units of lines.

An error discriminator 28 receives the demodulated data output to the signal line 20a after a clear pulse is supplied to a signal line 46k. The error discriminator 28 then decodes the data and performs reception error determination. Upon determining that there is no reception error, the error discriminator 28 outputs a "0"-level signal to a signal line 28a. Upon determining that there is a reception error, the error discriminator 28 outputs a "1"-level signal to the signal line 28a.

A power stoppage receivable station registration circuit 30 serves to register a distant station from which data can be memory-received at power stoppage when the receive mode is selected. For example, 100 distant stations can be registered in the registration circuit 30. When a distant station from which data can be memory-received at power stoppage is to be registered in the registration circuit 30, data is output to a signal line 30a according to the following format: a distant station number (one of "00" to "99", e.g., "00"), a space, and a distant station telephone number (e.g., 03-3758-2111). After this data is output to the signal line 30a, a write pulse is supplied to a signal line 46f, thus performing registration. When a distant station telephone number registered in the registration circuit 30 is to be read out, a distant station number (e.g., "00") is output first to the signal line 30a, and a read pulse is then supplied to a signal line 46g. With this operation, a distant station telephone number (e.g., 03-3758-21111) registered in the registration circuit 30 in correspondence with the distant station number is output to the signal line 30a.

A power stoppage receivable station registration key 32 is used to register a distant station from which data can be memory-received at power stoppage when the receive mode is selected. When the key 32 is depressed, a depression pulse is supplied to a signal line 32a.

Ten-key information from a ten-key pad 34 is output to a signal line 34a.

When a set-key 36 is depressed, a depression pulse is supplied to a signal line 36a.

A display unit 38 receives and displays information output to a signal line 46h.

A power stoppage receive rejected station information storing circuit 40 serves to store information on a distant station for which memory-reception is rejected at power stoppage. For example, 100 distant stations for which memory-reception is rejected are stored in the circuit 40. When information on a distant station for which memory-reception is rejected is to be stored in the circuit 40, data is output to a signal line 40a according to the following format: a distant station number (one of "00" to "99", e.g., "01"), a space, a distant station telephone number (e.g., 03-3111-2222), a space, an abbreviation of a distant station name (e.g., CANON HANBAI), space, and a communication start date and time (e.g., 12:10, Apr. 15, 1992). After the data is output to the signal line 40a, a write pulse is supplied to a signal line 46i. When information on a distant station for which memory-reception is rejected, registered in the circuit 40, is to be read out, a distant station number (e.g., "01") is output first to the signal line 40a, and a read pulse is then supplied to a signal line 46j. With this operation, data registered in the circuit 40 in correspondence with the distant station number is output to the signal line 40a according to the following format: a distant station telephone number (e.g., 03-3111-2222), a space, an abbreviation of a distant station name (e.g., CANON HANBAI), a space, and a communication start date and time (e.g., 12:10, Apr. 15, 1992).

A power stoppage detector 42 outputs a "1"-level signal to a signal line 42a when no power stoppage is detected, and outputs a "0"-level signal to the signal line 42a when power stoppage is detected.

A back-up circuit 44 has a secondary battery for the back-up function. When a "0"-level signal is output to the signal line 42a, i.e., power stoppage is caused, the back-up circuit 44 outputs a voltage to a signal line 44a to perform a back-up operation. When no power stoppage is caused, the secondary battery for the back-up function is charged, and voltages are applied from a power supply circuit (not shown) to all the circuits. When power stoppage occurs, the back-up circuit 44 applies voltages to the NCU 2, the hybrid circuit 6, the v21 modulator 8, the adder 16, the v21 demodulator 18, the v27ter or v29 demodulator 20, the memory circuit 22, an error discriminator 28, the power stoppage receive rejected station information storing circuit 40, and a control circuit 46.

The control circuit 46 mainly performs the following operation. At power stoppage, the control circuit 46 performs only memory-reception with respect to the backed-up memory. In this case, no recording and sending operations are performed. The control circuit 46 mainly performs the above operation.

Figure 2:
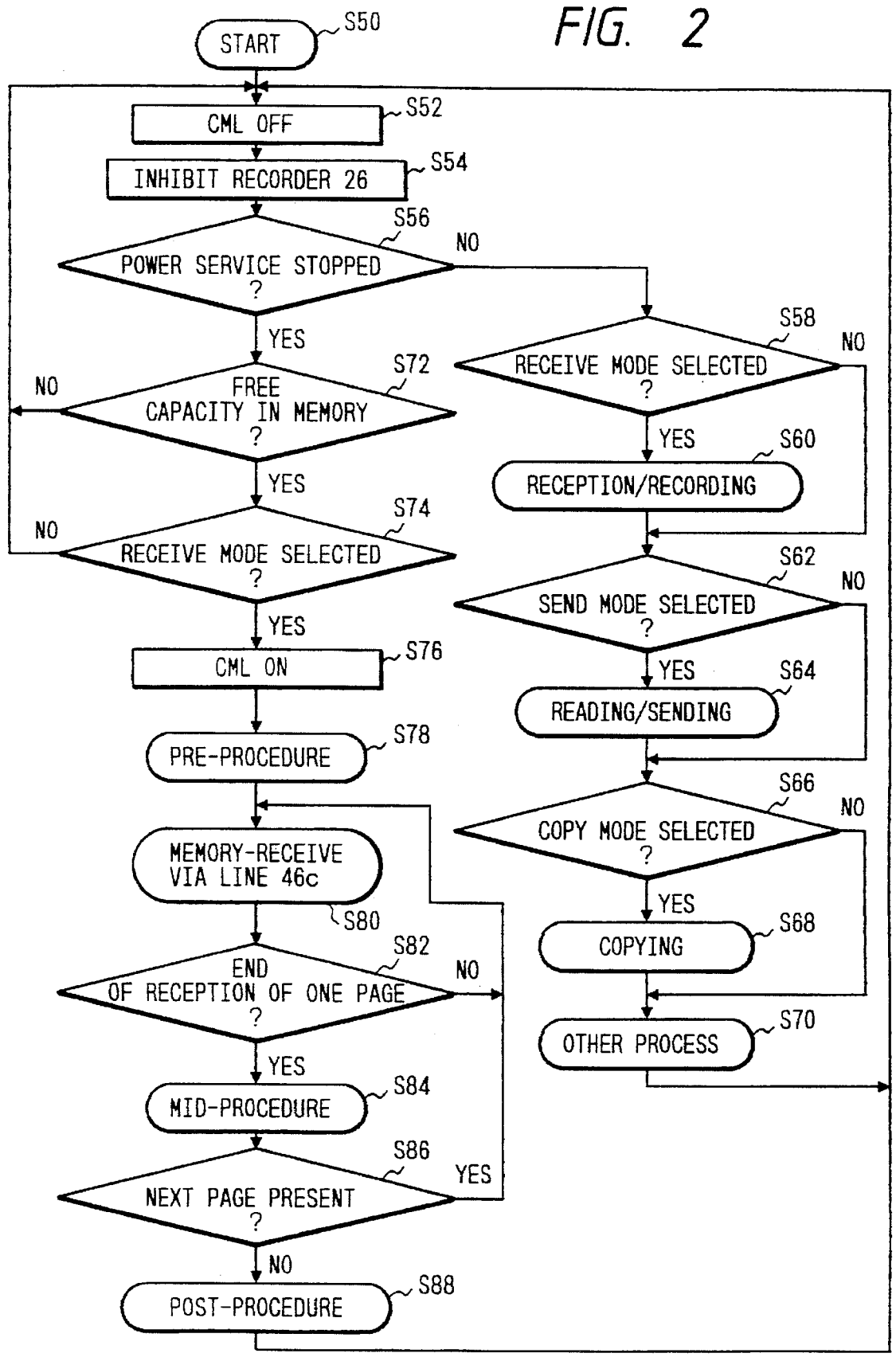
FIG. 2 is a flow chart showing a control sequence of a control circuit 46 in FIGS. 1A and 1B.

FIG. 2 is a flow chart showing a control sequence of the control circuit 46 in FIGS. 1A and 1B.

Referring to FIG. 2, the sequence is started from step S50.

In step S52, a "0"-level signal is output to the signal line 46a to turn off CML.

In step S54, a signal "0" is output to the signal line 46d to inhibit the recorder 26 from performing a recording operation.

In step S56, the control circuit 46 receives a signal on the signal line 42a to check whether power service is stopped. If YES in step S56, the flow advances to step S72. Otherwise, the flow advances to step S58.

In step S58, it is checked whether the receive mode is selected. If YES in step S58, the flow advances to step S60 to perform a reception/recording operation. If NO in step S58, the flow advances to step S62.

In step S62, it is checked whether the send mode is selected. If YES in step S62, the flow advances to step S64 to perform a reading/sending operation. If NO in step S62, the flow advances to step S66.

In step S66, it is checked whether the copy mode is selected. If YES in step S66, the flow advances to step S68 to perform a copying operation. If NO in step S66, the flow advances to step S70 to perform other process.

As described above, when no power stoppage occurs, all the required operations are performed from step S58 to step S70.

In step S72, it is checked whether there is a free capacity in the memory. If YES in step S72, it means that memory-reception can be performed. Hence, the flow advances to step S74. If NO in step S72, it means that memory-reception cannot be performed. Hence, the flow advances to step S52.

In step S74, it is checked whether the receive mode is selected. If YES in step S74, the flow advances to step S76. If NO in step S74, the flow advances to step S52.

In step S76, a "1"-level signal is output to the signal line 46a to turn on CML.

Step S78 indicates a pre-procedure.

In step S80, received information is stored in the memory circuit 22 via the signal line 46c. The control circuit 46 causes the error discriminator 28 to determine a reception state.

In step S82, it is checked whether reception of one page is completed. If YES in step S82, the flow advances to step S84. If NO in step S82, the flow advances to step S80.

Step S84 indicates a mid-procedure.

In step S86, it is checked whether the next page is present. If YES in step S86, the flow advances to step S80. If NO in step S86, the flow advances to step S88.

Step S88 indicates a post-procedure.

As described above, the operations from step S72 to step S88 are performed at power stoppage. That is, only memory-reception is performed in these steps.

(Second Embodiment)

In the above embodiment, when the receive mode is selected at power stoppage, data from all distant stations are memory-received.

However, the apparatus may include a means for registering distant stations from which data can be memory-received so that when the receive mode is selected at power stoppage, data from only the permitted distant stations can be memory-received. In this case, if reception of data from a distant station for which memory-reception is inhibited is selected, only information on the distant station is stored in a back-up storage means.

Figure 3:
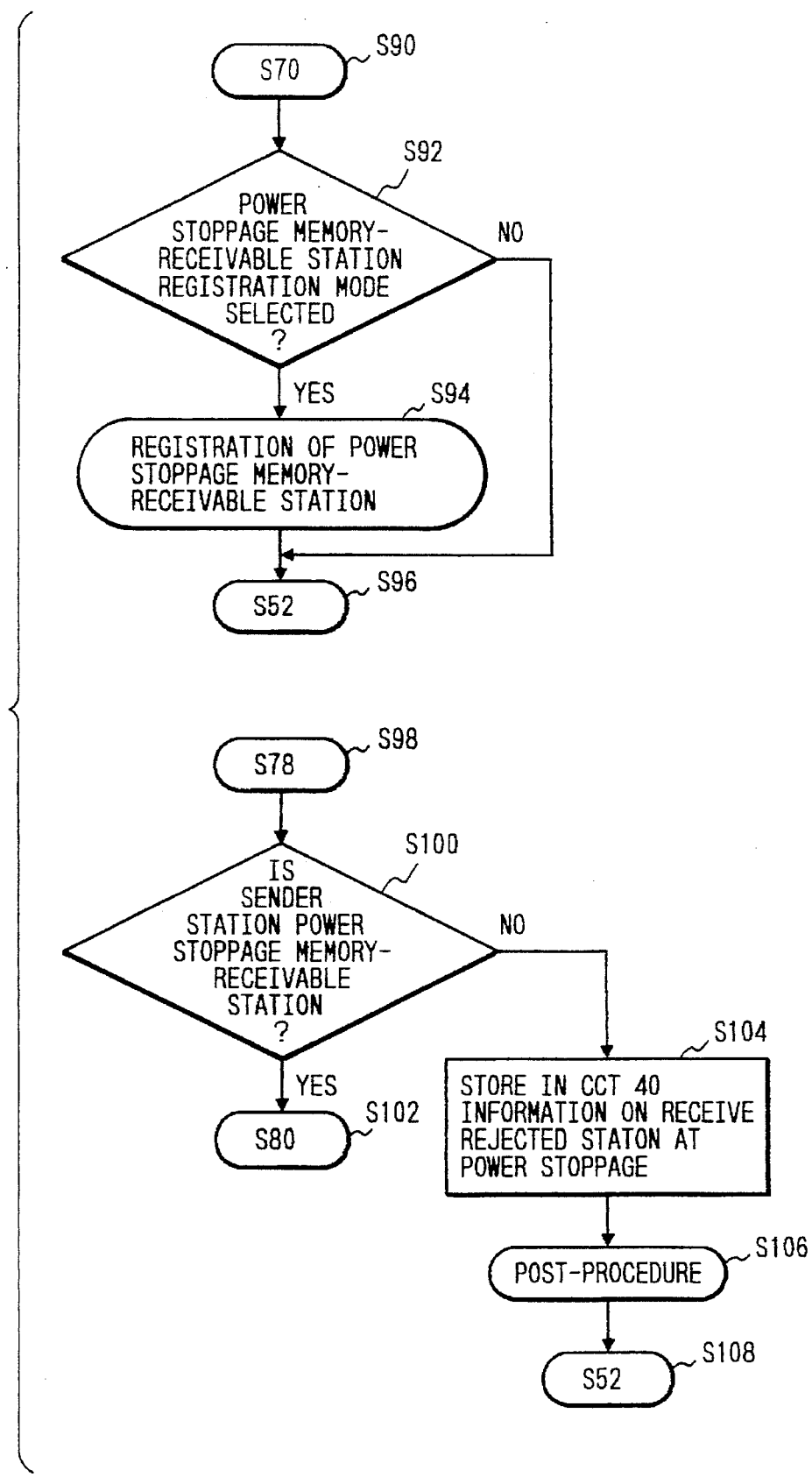
FIG. 3 is a flow chart showing another control sequence of the control circuit 46 in FIGS. 1A and 1B.

FIG. 3 shows the details of only portions, of the above control sequence, which are different from the corresponding portions of the control sequence shown in FIG. 2.

Step S90 in FIG. 3 is equivalent to step S70 in FIG. 2.

In step S92, it is checked whether the power stoppage memory-receivable station registration mode is selected. If YES in step S92, the flow advances to step S94 to register, in a registration circuit 30, a distant station from which data can be memory-received at power stoppage. If NO step S92, the flow advances to step S96.

Step S96 in FIG. 3 is equivalent to step S52 in FIG. 2.

Step S98 in FIG. 3 is equivalent to step S78 in FIG. 2.

In step S100, a TSI signal transmitted from a sender station is compared with a predetermined number of digits (e.g., lower six digits) of a telephone number registered in the circuit 30 to check whether the sender station is a power stoppage memory-receivable station. If YES in step S100, the flow advances to step S102. If NO in step S100, the flow advances to step S104.

Step S102 in FIG. 3 is equivalent to step S80 in FIG. 2.

In step S104, information on a distant station for which memory-reception is rejected at power stoppage is stored in a power stoppage receive rejected station information storing circuit 40.

Step S106 indicates a post-procedure, in which no reception is performed.

Step S108 in FIG. 3 is equivalent to step S52 in FIG. 2.

(Third Embodiment)

In the above embodiment, the TSI signal from the sender station is compared with the lower six digits of the telephone number registered in the circuit 30. However, these digits (e.g., upper six digits) may be externally registered, or the number of digits to be compared may be changed.

(Fourth Embodiment)

In the above embodiment, a distant station from which data is memory-received is stored in the circuit 30. However, data from only distant stations registered at one-touch dials or abbreviation dials may be memory-received.

(Fifth Embodiment)

In addition to the functions of the second embodiment, the fifth embodiment includes a function of automatically recording information, memory-received at power stoppage, after the power stoppage is canceled. Furthermore, information on a distant station for which memory-reception is rejected is automatically recorded after the power stoppage is canceled.

Figure 4:
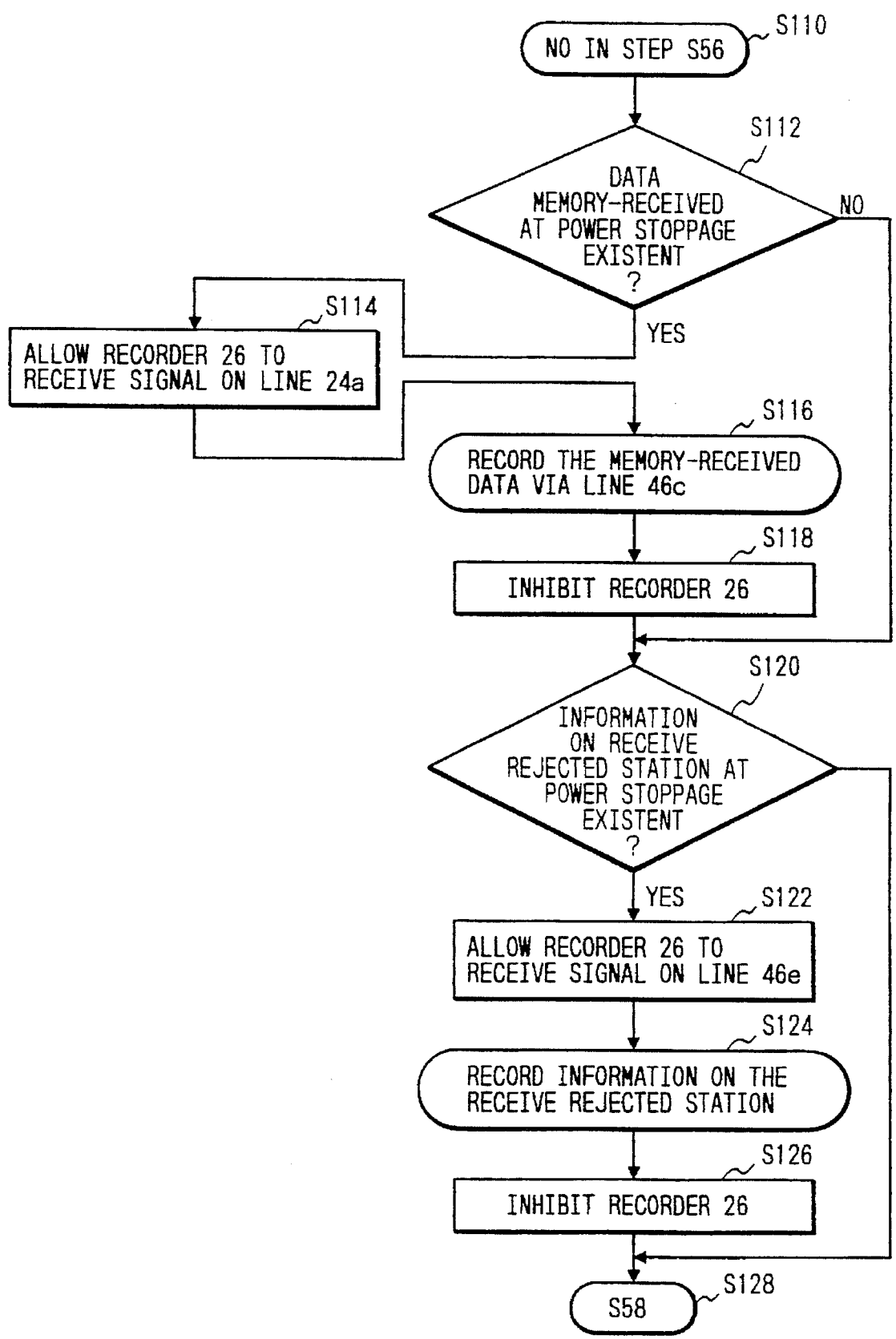
FIG. 4 is a flow chart showing still another control sequence of the control circuit 46 in FIGS. 1A and 1B.

FIG. 4 shows the details of only portions, of the above control sequence, which are different from the corresponding portions of the control sequence shown in FIG. 3.

Step S110 in FIG. 4 indicates "NO" in Step S56 in FIG. 2.

In step S112, it is checked whether data is memory-received at power stoppage. If YES in step S112, the flow advances to step S114. If NO in step S112, the flow advances to step S120.

In step S114, a signal "1" is output to a signal line 46d to allow a recorder 26 to receive a signal on a signal line 24a.

In step S116, the data which is memory-received via a signal line 46c at the power stoppage is recorded.

In step S118, a signal "0" is output to the signal line 46d to inhibit the recorder 26 from performing a recording operation.

In step S120, it is checked whether information on a distant station for which memory-reception is rejected at the power stoppage is present. If YES in step S120, the flow advances to step S122. If NO in step S120, the flow advances to step S128.

In step S122, a signal "2" is output to the signal line 46d to allow the recorder 26 to receive a signal on a signal line 46e.

In step S124, information on the distant station for which memory-reception is rejected at the power stoppage is recorded.

In step S126, a signal "0" is output to the signal line 46d to inhibit the recorder 26 from performing a recording operation.

Step S128 in FIG. 4 is equivalent to step S58 in FIG. 2.

(Sixth Embodiment)

In the fifth embodiment, data memory-received at power stoppage is automatically output after the power stoppage is canceled. However, the data may be recorded in accordance with an instruction from an operator. In addition, information on a distant station, received at power stoppage, may be recorded in accordance with an instruction from the operator after the power stoppage is canceled.

Figure 5:
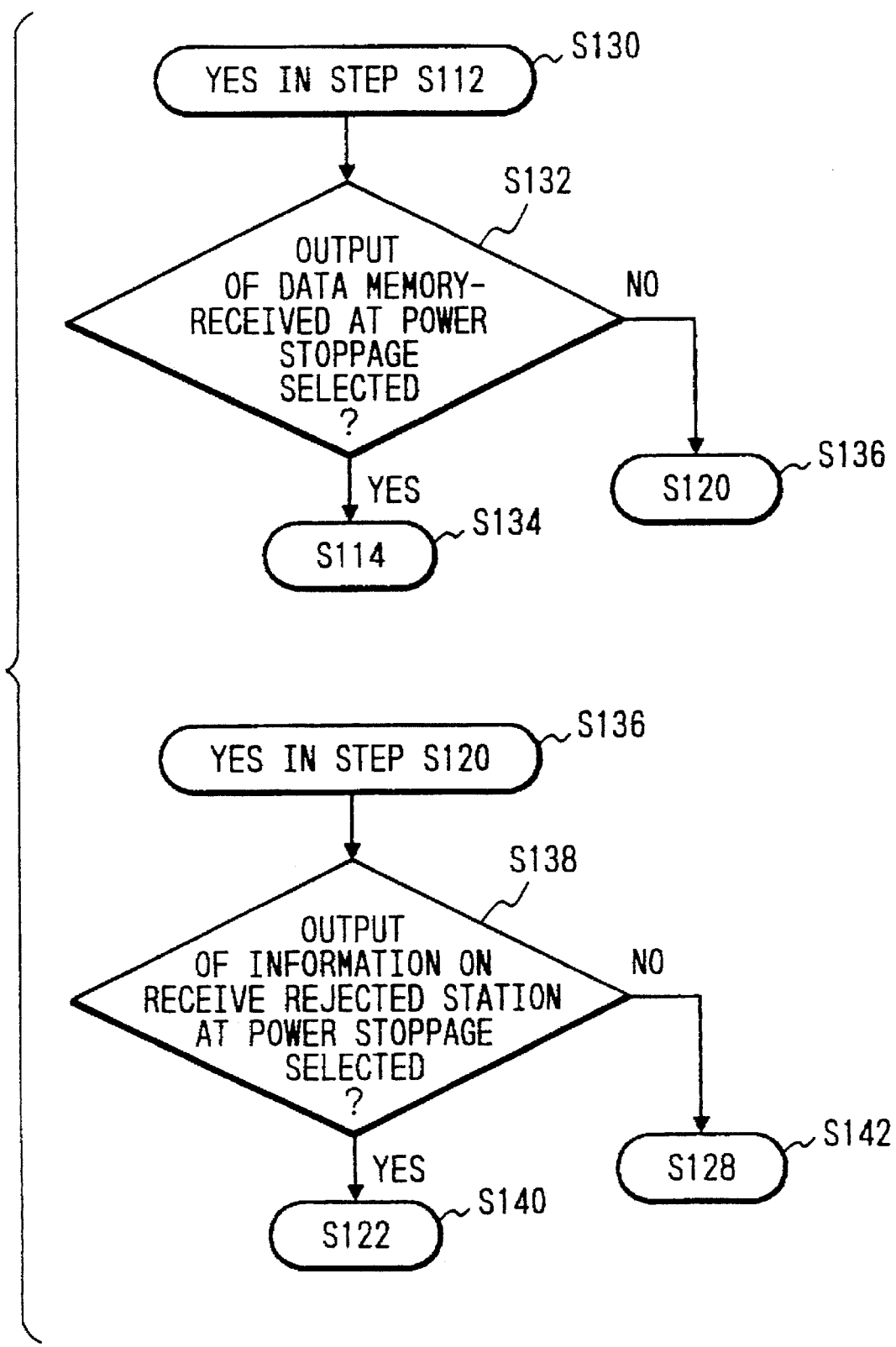
FIG. 5 is a flow chart showing still another control sequence of the control circuit 46 in FIGS. 1A and 1B.

FIG. 5 shows the details of only portions, of the above control sequence, which are different from the corresponding portion of the control sequence shown in FIG. 4.

Step S130 in FIG. 5 indicates "YES" in step S112 in FIG. 4.

In step S132, it is checked whether output of data memory-received at power stoppage is selected. If YES in step S134, the flow advances to step S136.

Steps S134 and S136 in FIG. 5 are equivalent to steps S114 and S120 in FIG. 4, respectively.

Step S136 in FIG. 5 indicates "YES" in step S120 in FIG. 4.

In step S138, it is checked whether output of information on a distant station for which memory-reception is rejected at power stoppage is selected. If YES in step S138, the flow advances to step S140. If NO in step S138, the flow advances to step S142.

Steps S140 and S142 in FIG. 5 are equivalent to steps S122 and S128 in FIG. 4, respectively.

As has been described above, according to the present invention, even if power stoppage occurs, data can be memory-received, and the data can be recorded after the power stoppage is canceled. Therefore, important data can be received at power stoppage. That is, there is no possibility of losing a big business chance. In addition, distant stations from which data can be memory-received at power stoppage can be registered so that data from only the registered stations can be memory-received.

What is claimed is:

1. An image data communication apparatus, comprising:

main power supply means for supplying power to said apparatus;

detection means for detecting a power failure of said main power supply means;

reception means for receiving image data and receiving power from a secondary power supply means, while the power failure is detected by said detection means;

record means for recording the image data received by said reception means, said record means recording that data while receiving power from said main power supply means; and storage means for storing the image data received by said reception means and receiving power from the secondary supply means, while the power failure is detected by said detection means, wherein, while the power failure is detected by said detecting means, the received image data is not recorded by said record means.

2. An apparatus according to claim 1, further comprising transmission means for transmitting image data and control means for controlling said transmission means, wherein while the power failure is detected by said detection means, said control means controls said transmission means so as to inhibit transmission of the image data.

3. An apparatus according to claim 1, wherein when recovery from power failure is detected by said detection means, the image data, received at the power failure and stored in said storage means, is outputted in accordance with an instruction from an operator.

4. An apparatus according to claim 1, wherein when recovery from power failure is detected by said detection means, the image data, received at the power failure, and stored in said storage means, is automatically outputted.

5. An apparatus according to claim 1, wherein said apparatus is a facsimile apparatus.

6. A method according to claim 1, wherein, when recovery from power failure is detected, the image data received at the power failure and stored in the storage means, is outputted in accordance with an instruction from an operator.

7. An image data communication apparatus, comprising:

main power supply means for supplying power to said apparatus;

reception means for receiving image data;

record means for recording the image data received by said reception means receiving power from said main power supply means;

detection means for detecting a power failure of said main power supply means;

storage means for storing the image data received by said reception means and receiving power from a secondary supply means, while the power failure is detected by said detection means, wherein while the power failure is detected by said detecting means, the received image data is not recorded by said record means; and registration means for registering a destination station from which data can be received, while the power failure is detected by said detection means, and wherein said storage means stores the image data received from a destination station registered in said registration means, and said storage means does not store the image data received from a destination station which is not registered in said registration means.

8. An apparatus according to claim 7, further comprising second memory means, and wherein said second memory means stores data associated with the destination station which is not registered in said registration means and from which data is received, while the power failure is detected by said detection means.

9. An apparatus according to claim 8, wherein when recovery from power failure is detected by said detection means, the data, associated with the destination station from which data is received at the power failure and stored in said second memory means, is outputted in accordance with an instruction from an operator.

10. An apparatus according to claim 8, wherein when recovery from power failure is detected by said detection means, the data, associated with the destination station from which data is received at the power failure and stored in said second memory means, is automatically outputted.

11. An image data communication apparatus, comprising:

main power supply means for supplying power to said apparatus;

detection means for detecting a power failure of said main power supply means;

reception means for receiving image data and receiving power from a secondary power supply means, while the power failure is detected by said detection means;

record means for recording the image data received by said reception means receiving power from said main power supply means;

storage means for storing the image data received by said reception means; and control means for controlling said storage means and said record means, wherein, while the power failure is not detected by said detection means, said control means causes said record means to record the image data received by said reception means, wherein, while the power failure is detected by said detection means, said control means causes said storage means to store the image data received by said reception means, without causing said record means to record the image data received by said reception means, and wherein, while the power failure is detected by said detection means, said control means receives power from the secondary power supply means.

12. An apparatus according to claim 11, further comprising transmission means for transmitting image data, wherein while the power failure is detected by said detection means, said control means inhibits said transmission means from transmitting the image data.

13. An apparatus according to claim 11, wherein when recovery from power failure is detected by said detection means, said control means automatically reads out image data, received at the power failure, from said storage means, and outputs the read data.

14. An apparatus according to claim 11, wherein when recovery from power failure is detected by said detection means, said control means reads out image data, received at the power failure from said storage means, and outputs the read data in accordance with an instruction from an operator.

15. An apparatus according to claim 11, wherein said image data communication apparatus is a facsimile apparatus.

16. An image data communication apparatus, comprising:

main power supply means for supplying power to said apparatus;

reception means for receiving image data;

record means for recording the image data received by said reception means receiving power from said main power supply means;

detection means for detecting a power failure of said main power supply means;

storage means for storing the image data received by said reception means;

control means for controlling said storage means and said record means, wherein while the power failure is not detected by said detection means, said control means causes said record means to record the image data received by said reception means, wherein while the power failure is detected by said detection means, said control means causes said storage means to store the image data received by said reception means, without causing said record means to record the image data received by said reception means, and wherein while the power failure is detected by said detection means, said control means, said control means receives power from a secondary power supply means; and registration means for registering a destination station from which data can be received when the power failure is detected by said detection means and wherein said control means causes said storage means to store the image data received from a destination station registered in said registration means, and inhibits said storage means from storing the image data received from a destination station which is not registered in said registration means.

17. An apparatus according to claim 16, further comprising second memory means, and wherein said control means causes said second memory means to store data associated with the destination station which is not registered in said registration means and from which data is received, while the power failure is detected by said detection means.

18. An apparatus according to claim 17, wherein when recovery from power failure is detected by said detection means, said control means reads out data, associated with a destination station from which data is received at the power failure, from said second memory means, and outputs the read data in accordance with an instruction from an operator.

19. An apparatus according to claim 17, wherein when recovery from power failure is detected by said detection means, said control means automatically reads out data, associated with the destination station from which data is received at the power failure, from said second memory means, and outputs the read data.

20. An image data communication apparatus, comprising:

main power supply means for supplying power to said apparatus;

detection means for detecting a power failure of said main power supply means;

reception means for receiving image data and receiving power from a secondary power supply means, while the power failure is detected by said detection means;

record means for recording the image data received by said reception means receiving power from said main power supply means;

storage means for storing the image data received by said reception means; and control means for selecting recording of the received image data or storing of the received image data in accordance with a result of detection means, wherein, while the power failure is detected by said detection means, said control means receives power from the secondary power supply means.

21. An apparatus according to claim 20, further comprising transmission means for transmitting image data wherein while the power failure is detected by said detection means, said control means inhibits said transmission means form transmitting the image data.

22. An apparatus according to claim 20, wherein when recovery from power failure is detected by said detection means, said control means automatically reads out image data, received at the power failure, from said storage means, and outputs the read image data.

23. An apparatus according to claim 20, wherein when recovery from power failure is detected by said detection means, said control means reads out image data, received at the power failure, from said storage means, and outputs the read data in accordance with an instruction from an operator.

24. An apparatus according to claim 20, wherein said image data communication apparatus is a facsimile apparatus.

25. An apparatus, comprising:

main power supply means for supplying power to said apparatus;

reception means for receiving image data;

record means for recording the image data received by said reception means receiving power from said main power supply means;

detection means for detecting a power failure of said main power supply means;

storage means for storing the image data received by said reception means;

control means for selecting recording of the received image data or storing of the received image data in accordance with a result of detection means, wherein while the power failure is detected by said detection means, said control means receives power from a secondary power supply means; and registration means for registering a destination station from which data can be received when the power failure is detected by said detection means, and wherein said control means causes said storage means to store the image data received from a destination station registered in said registration means, and inhibited the storage means from storing image data received from a destination station which is not registered in said registration means.

26. An apparatus according to claim 25, further comprising second memory means, and wherein said control means causes said second memory means to store data associated with the destination station which is not registered in said registration means and from which data is received, while the power failure is detected by said detection means.

27. An apparatus according to claim 26, wherein when recovery from power failure is detected by said detection means, said control means reads out the data, associated with the destination station from which data is received at the power failure, from said second memory means, and outputs the read data in accordance with an instruction from an operator.

28. An apparatus according to claim 26, wherein when recovery from power failure is detected by said detection means, said control means automatically reads out data, associated with the destination station from which data is received at the power failure, from said second memory means, and outputs the read data.

29. An image data communication method, comprising the steps of:

supplying power to an image data communication apparatus, using a main power supply means;

detecting a power failure of the main power supply means and detecting recovery from the power failure;

receiving image data and receiving power from a secondary power supply means, while the power failure is detected in said detecting step;

recording, using a recording means, the image data received in said receiving step, said recording being performed while the recording means receives power from the main power supply means; and storing, in a storage means, the image data received in said receiving step, the storage means receiving power from the secondary supply means, while the power failure is detected in said detecting step, wherein, while the power failure is detected in said detecting step, said recording of the received image data is not performed by the recording means.

30. A method according to claim 29, further comprising the step of transmitting image data using a transmission means, wherein, while the power failure is detected in said detecting step, the transmission means is controlled so as to inhibit transmission of the image data.

31. A method according to claim 29, wherein, when recovery from power failure is detected, the image data received at the power failure and stored in the storage means, is automatically outputted.

32. A method according to claim 29, wherein the apparatus is a facsimile apparatus.

33. An image data communication method for use in an image data communication apparatus, comprising the steps of:

supplying power from a main power supply means to the apparatus;

receiving image data;

recording the image data received in said receiving step, said recording step being performed using power received from the main power supply means;

detecting a power failure of the main power supply means;

storing, in a first storage means, the image data received in said receiving step, said storing step being performed using power received from a secondary supply means, while the power failure is detected, wherein, while the power failure is detected, said recording step is not performed on the received image data; and registering a destination station from which data can be received, while the power failure is detected, and wherein the image data received from a destination station registered in said registering step is stored, and wherein the image data received from a destination station which is not registered in said registering step, is not stored.

34. A method according to claim 33, further comprising a second storing step, in which is stored, in a second storage means, data associated with the destination station which is not registered in said registering step and from which data is received, while the power failure is detected.

35. A method according to claim 34, wherein, when recovery from power failure is detected, the data, associated with the destination station from which data is received at the power failure and stored in said second storing step, is outputted in accordance with an instruction from an operator.

36. A method according to claim 34, wherein, when recovery from power failure is detected, the data, associated with the destination station from which data is received at the power failure and stored in said second storing step, is automatically outputted.

37. An image data communication method for use in an image data communication apparatus, comprising the steps of:

supplying power from a main power supply means to the apparatus;

receiving image data;

recording the image data received in said receiving step, said recording step being performed using a record means and using power received from the main power supply means;

detecting a power failure of the main power supply means;

storing in a storage means the image data received in said receiving step;

controlling the storage means and the record means such that, while the power failure is not detected, the record means is caused to record the image data received in said receiving step, and such that, while the power failure is detected, the image data received in said receiving step is stored in the storage means, without causing the record means to record the image data received in said receiving step, and such that, while the power failure is detected, said controlling step is performed using power received from a secondary power supply means; and registering a destination station from which data can be received when the power failure is detected, and wherein said controlling step includes causing storage of the image data received from a destination station registered in said registering step, and inhibits storage of image data received from a destination station which is not registered in said registering step.

38. A method according to claim 37, wherein said controlling step includes causing storage, in a second storage means, of data associated with the destination station which is not registered in said registering step and from which data is received, while the power failure is detected.

39. A method according to claim 38, wherein, when recovery from power failure is detected, data stored in the second storage means, and associated with a destination station from which data is received at the power failure, is read out from the second memory means, and is outputted in accordance with an instruction from an operator.

40. A method according to claim 38, wherein, when recovery from power failure is detected, data, stored in the second memory means, and associated with a destination station from which data is received at the power failure, is automatically read out from the second memory means, and is outputted.

41. A method comprising the steps of:

supplying power from a main power supply means to an apparatus;

receiving image data;

recording the image data received in said receiving step, using power received from the main power supply means;

detecting a power failure of the main power supply means;

storing, in a storage means, the image data received in said receiving step;

selecting recording of the received image data or storing of the received image data in accordance with a result obtained in said detecting step, wherein, while the power failure is detected, said selecting step is performed using power received from a secondary power supply means; and registering a destination station from which data can be received when the power failure is detected, and wherein the storage means is caused to store the image data received from a destination station registered in said registering step, and is caused to inhibit storage of the image data received from a destination station which is not registered in said registering step.

42. A method according to claim 41, further comprising the step of causing a second memory means to store data associated with the destination station which is not registered in said registering step and from which data is received, while the power failure is detected.

43. A method according to claim 42, wherein, when recovery from power failure is detected, the data stored in the second memory means and associated with the destination station from which data is received at the power failure, is read out from the second memory means and is outputted in accordance with an instruction from an operator.

44. A method according to claim 42, wherein, when recovery from power failure is detected, data, stored in the second storage means, and associated with a destination station from which data is received at the power failure, is automatically read out from the second memory means, and is outputted.

45. An image data communication method, comprising the steps of:

supplying power to an image data communication apparatus, using a main power supply means;

detecting a power failure of the main power supply means, and detecting recovery from the power failure;

receiving image data and receiving power from a secondary power supply means, while the power failure is detected in said detecting step;

recording the image data received in said receiving step, using a recording means, the recording means receiving power from the main power supply means;

storing, in a storage means, the image data received in said recepting step; and controlling the storage means and the record means, wherein, while the power failure is not detected, said controlling step is performed in such manner as to cause the record means to record the image data received in said receiving step, wherein, while the power failure is detected, said controlling step is performed in such manner as to cause the storage means to store the image data received in said receiving step, without causing the record means to record the image data received in said receiving step, and wherein, while the power failure is detected, said controlling step is performed using power received from the secondary power supply means.

46. A method according to claim 45, further comprising the step of transmitting image data, using a transmission means, wherein, while the power failure is detected, said controlling step is performed in such manner as to inhibit the transmission means from transmitting the image data.

47. A method according to claim 45, wherein, when recovery from power failure is detected, said controlling step is performed such as to read out image data, received from the storage means during the power failure, and outputs the read data in accordance with an instruction from an operator.

48. A method according to claim 45, wherein, when recovery from power failure is detected, said controlling step is performed such as automatically to read out image data received during the power failure, from the storage means, and outputs the read data.

49. An image data communication method, comprising the steps of:

supplying power to an image data communication apparatus, using a main power supply means;

detecting a power failure of the main power supply means, and detecting a recovery from the power failure;

receiving image data and receiving power from a secondary power supply means, while the power failure is detected;

recording the image data received in said receiving step, using a recording means that receives power from the main power supply means;

storing, in a storage means, the image data received in said receiving step; and selecting recording of the received image data or storing of the received image data in accordance with a result obtain in said detecting step, wherein, while the power failure is detected, said selecting step is performed using power received from the secondary power supply means.

50. A method according to claim 49, further comprising the step of transmitting image data, using a transmission means, wherein, while the power failure is detected, the transmission means is inhibited from transmitting the image data.

51. A method according to claim 49, wherein, when recovery from power failure is detected, image data received during the power failure is read out from the storage means, and the read data is outputted in accordance with an instruction from an operator.

52. A method according to claim 49, wherein, when recovery from power failure is detected, image data received during the power failure is automatically read out from the storage means, and the read image data is outputted.

53. A method according to claim 49, wherein the image data communication apparatus is a facsimile apparatus.

* * * * *

UNITED STATES PATENT AND TRADEMARK OFFICE
CERTIFICATE OF CORRECTION

PATENT NO. : 5,668,642

DATED : September 16, 1997

INVENTOR(S): TAKEHIRO YOSHIDA

It is certified that error appears in the above-identified patent and that said Letters Patent is hereby corrected as shown below:

<u>COLUMN 3</u>
Line 42, "receive rejected" should read --receive-rejected--.

<u>COLUMN 9</u>
Line 29, "said control means," should read deleted.

<u>COLUMN 10</u>
Line 54, "inhibited" should read --inhibits--.

<u>COLUMN 13</u>
Line 57, "recepting" should read --receiving--.

<u>COLUMN 14</u>
Line 42, "obtain" should read --obtained--.

Signed and Sealed this

Fourteenth Day of July, 1998

Attest:

BRUCE LEHMAN

Attesting Officer

Commissioner of Patents and Trademarks